United States Patent
Molyneux

[11] 3,713,946
[45] Jan. 30, 1973

[54] METHOD OF MAKING FIBER REINFORCED COMPOSITES

[75] Inventor: Walter Guillam Molyneux, Farnborough, Hampshire, England

[73] Assignee: National Research Development Corporation, London, England

[22] Filed: April 23, 1970

[21] Appl. No.: 31,150

[30] Foreign Application Priority Data

April 30, 1969 Great Britain.....................22,043/69

[52] U.S. Cl. ..................156/293, 156/276, 156/294
[51] Int. Cl..............................................B29c 19/00
[58] Field of Search..............156/276, 293, 294, 313

[56] References Cited

UNITED STATES PATENTS

| 2,876,154 | 3/1959 | Usab | 156/276 X |
| 3,487,149 | 12/1969 | Bunish et al. | 156/276 X |
| 3,328,229 | 6/1967 | Windecker | 156/293 X |
| 2,211,071 | 8/1940 | Moss | 156/293 X |

Primary Examiner—Benjamin R. Padgett
Assistant Examiner—R. L. Tate
Attorney—Larson, Taylor and Hinds

[57] ABSTRACT

A process for producing a composite material article comprising inserting an inner member together with a mixture of fibrous reinforcement impregnated with partially cured resin, the mixture at least partially enveloping the inner member, into a hollow sheath wherein the mixture fills the space between the inner member and the hollow sheath.

2 Claims, 1 Drawing Figure

PATENTED JAN 30 1973 3,713,946
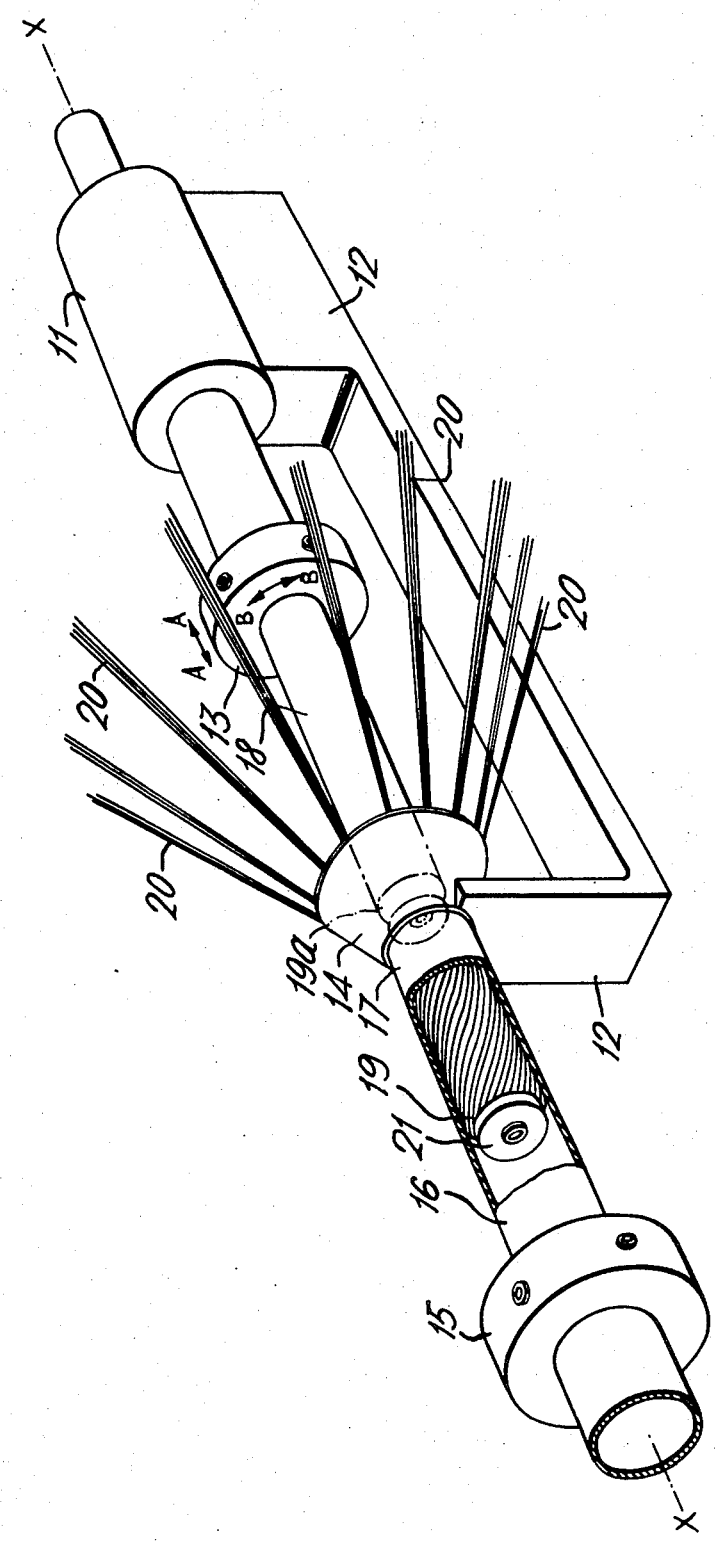

METHOD OF MAKING FIBER REINFORCED COMPOSITES

This invention relates to composite material articles and processes for their manufacture.

Composite material articles are known and comprise, for example, fibrous reinforcement such as glass or carbon fibers in a resin matrix. Such articles are used because of their good structural characteristics, in particular their high strength to weight ratio compared to homogeneous material articles such as metal.

It is an object of the present invention to provide an improved composite material article and a process for producing such articles.

A process for producing a composite material article according to the present invention comprises inserting an inner member together with a mixture of fibrous reinforcement impregnated with partially cured resin, the mixture at least partially enveloping the inner member, into a hollow sheath wherein the mixture fills the space between the inner member and the hollow sheath.

The inner member may be driven into or drawn into the hollow sheath, the impregnated fibrous reinforcement being secured to the inner member to be moved with it.

The fibrous reinforcement may comprise a tow of carbon fibers of the type disclosed in U.K. Pat. No. 1,110,791 and the resin may comprise an epoxy, polyester, polyimide or furane type resin.

The resin may be of a type which is partially cured by the application of heat prior to insertion or may include a hardener and catalyst which effect sufficient partial cure prior to the insertion process and are effective subsequently to insertion to effect complete cure.

Where the resin content of the composite material is of the type in which cure is effected by heating, final cure of the resin may be carried out by heating the article subsequent to manufacture.

In the case of a hollow sheath of circular cross section provision may be made for effecting relative rotation between the sheath on the one hand and the inner member and mixture on the other hand about the longitudinal axis of the sheath.

The invention is illustrated by way of example in the accompanying diagrammatic drawing.

As shown, a thrust torque driving unit 11 is supported on a frame 12. A driven chuck member 13 engages the driving unit 11 and may be driven by it axially in the direction of arrows A—A and rotationally in the direction of arrow B—B. A frusto-conical funnel guide 14 is supported on the frame 12. A fixed chuck 15 is arranged in axial alignment about a common axis X—X with the driving unit 11 and driven member 13. For operation a hollow tubular sheath 16 is mounted in the chuck 15 with its right hand end 17 as shown in the drawing engaging the guide 14. A length of feedstock comprising a tubular inner member 18 of outside diameter smaller than the inside diameter of the sheath 16 is passed through the driving unit 11 as driven member 13 until its left hand end as shown in dotted lines at 19a is within the guide 14 and just clear of the end 17 of the sheath. A series of tows of carbon fibers impregnated with partially cured epoxy resin, some of which are shown at 20—20, have their ends secured by a clamp 21 to the end 19 of the member 18. The driven chuck member 13 is now set adjacent the driving member 11 and tightened to grip the inner member 18. The driving unit 11 is then operated and drives the chuck member 13 axially towards and rotationally with respect to the sheath 16. The tubular inner member 18 is thus inserted into the sheath 16 together with the impregnated fibers which latter, because of the rotational motion, are laid up in helical fashion as shown to fill the space between the sheath 16 and inner member 18. For convenience the drawing shows the manufacturing stage part way through its stroke. When the driven chuck member 13 reaches the end of its stroke, which is adjacent the guide 14, the driving unit 11 is stopped, the chuck member 13 is released from the inner member 18 and the drive reversed to return the chuck member along the inner member 18 towards the driving unit in preparation for another forward stroke. In this particular case the resin included a hardener and catalyst which effected cure of the resin subsequent to manufacture.

In other cases using resin which may be heat cured, final cure may be effected by heating after manufacture.

In an alternative arrangement (not shown) the inner member is drawn into the outer sheath.

I claim:

1. A process for producing an elongate composite-material using an inner member, a surrounding sleeve having a substantially smooth inner wall, and fibrous reinforcement filling the space between the inner member and the sleeve, the process comprising the steps of assembling around said member a plurality of continuous fibers inpregnated with partially cured resin, rigidly attaching only end portions of the fibers to a suitable region of the member, providing a sleeve of internal dimensions which are larger than the external dimensions of the member alone but smaller than the external dimensions of the member fiber assembly at this stage except where the fibers are attached to the member, introducing the fiber/member assembly into one end of the sleeve, sliding said assembly with the fibers moving attached ends first longitudinally over the inner wall of the sleeve, simultaneously providing a relative rotation between the member and the sleeve about the direction of longitudinal motion of said assembly, and completing curing of said resin.

2. A process according to claim 1 wherein at least a portion of the fibrous reinforcement comprises carbon fibers.

* * * * *